(12) United States Patent
Pelletier et al.

(10) Patent No.: US 8,031,616 B2
(45) Date of Patent: Oct. 4, 2011

(54) SYSTEMS AND METHODS FOR ACCESSING IP TRANSMISSIONS

(75) Inventors: Jeffrey P. Pelletier, Westminster, CO (US); Elliot Eichen, Arlington, MA (US)

(73) Assignee: Level 3 Communications, LLC, Broomfield, CA (US)

( * ) Notice: Subject to any disclaimer, the term of this patent is extended or adjusted under 35 U.S.C. 154(b) by 1099 days.

(21) Appl. No.: 11/086,471

(22) Filed: Mar. 21, 2005

(65) Prior Publication Data

US 2009/0262723 A1    Oct. 22, 2009

Related U.S. Application Data

(63) Continuation-in-part of application No. 11/001,887, filed on Dec. 1, 2004.

(60) Provisional application No. 60/555,603, filed on Mar. 23, 2004.

(51) Int. Cl.
*G06F 11/00* (2006.01)
(52) U.S. Cl. .................................. 370/241; 370/401
(58) Field of Classification Search .............. 370/241
See application file for complete search history.

(56) References Cited

U.S. PATENT DOCUMENTS

| 2001/0052081 A1 | 12/2001 | McKibben et al. |
| 2002/0009973 A1 | 1/2002 | Bondy et al. |
| 2002/0051518 A1 | 5/2002 | Bondy et al. |
| 2002/0097724 A1 | 7/2002 | Halme et al. |
| 2003/0091026 A1 | 5/2003 | Penfield et al. |
| 2003/0156576 A1 | 8/2003 | Crutcher et al. |
| 2003/0227917 A1* | 12/2003 | Maher et al. ................. 370/392 |
| 2004/0047451 A1 | 3/2004 | Barker et al. |
| 2004/0240439 A1 | 12/2004 | Castleberry et al. |
| 2006/0212933 A1* | 9/2006 | Scoggins et al. ................ 726/11 |

OTHER PUBLICATIONS

TeleStrategies: ISS World 2003; Intelligence Support Systems for Lawful Interception and Internet Surveillance; Nov. 13-14, 2003, McLean, VA.

Non-Final Office Action mailed Oct. 30, 2008, U.S. Appl. No. 11/001,887, filed Dec. 1, 2004, Applicant: Jeffrey P. Pelletier, 7 pages.

* cited by examiner

*Primary Examiner* — Kevin C Harper

(74) *Attorney, Agent, or Firm* — John C. Heuton

(57) ABSTRACT

Various systems and methods for intercepting transmissions are disclosed. In one embodiment, a system is disclosed that includes an internet protocol media gateway. The internet protocol media gateway is communicably coupled to a soft switch, an acquisition facility, and a communicator. The internet protocol media gateway is associated with a processor and a computer readable medium, and the computer readable medium includes instructions executable by the processor to receive a transmission identified with the communicator, and to direct the transmission to the acquisition facility. Various other systems and methods are also disclosed.

34 Claims, 6 Drawing Sheets

SYSTEMS AND METHODS FOR ACCESSING IP TRANSMISSIONS

CROSS REFERENCE TO RELATED CASES

The present application claims priority to U.S. Provisional Patent Application No. 60/555,603 entitled "Systems and Methods for Intercepting Communications" filed by Pelletier et al. on Mar. 23, 2004. Further, the present application is a continuation-in-part of U.S. patent application Ser. No. 11/001,887, entitled "Systems and Methods for Accessing Audio Transmissions" filed by Pelletier on Dec. 1, 2004, and assigned to an entity common hereto. The entirety of the aforementioned provisional and non-provisional patents are incorporated herein by reference for all purposes.

BACKGROUND OF THE INVENTION

The present invention provides systems and methods for monitoring various transmissions. More particularly, the present invention provides various methods for monitoring real time transmissions passed over a Internet Protocol (IP) network.

In some cases it has been deemed desirable to provide third party access to voice communications. Such an approach has typically included obtaining a court order allowing for a wire tap of a particular telephone number, and providing the court order to a telecommunications company servicing the particular telephone number. Based on the court order, the telecommunications company places a tap at the central office of the telephone company. The tap provides a copy of communications ongoing in relation to the particular telephone number to the entity providing the court order to the telecommunications company. Such an approach, however, is unworkable in the increasing complexity and diversity of the communications market.

Hence, among other things, there exists a need in the art for advanced systems and methods facilitating third party access to communications.

BRIEF SUMMARY OF THE INVENTION

The present invention provides systems and methods for monitoring various transmissions. More particularly, the present invention provides various methods for monitoring real time transmissions passed over a Internet Protocol (IP) network.

In various cases, the present invention can be applied to a voice over IP (VOIP) network to monitor quasi real time transmissions ongoing in relation to a selected endpoint. In such cases, a transmission between two or more endpoints is detected, and at least a portion of the transmission is directed to an acquisition facility where the transmission is monitored. In some instances, the monitoring can be performed without introducing observable changes to the transmission passing between selected endpoints. Thus, for example, the systems and methods can be implemented such that any time delay or other indication of the monitoring is not detectable at any of the endpoints. Thus, in some cases, the systems and methods of the present invention can be used for implementing monitoring of VOIP network activity consistent with the requirements of the United States Cooperative Assistance to Law Enforcement Act. Application of the invention to a VOIP network can include monitoring transmissions from IP to IP, and to/from IP and PSTN or other border networks.

Some embodiments of the present invention provide methods for intercepting real time IP transmissions. Such methods include providing an IP media gateway that communicably couples a VOIP network with a plurality of communicators, and also is communicably coupled to an acquisition facility. The methods also include receiving a real time transmission at the IP media gateway associated with one of the plurality of communicators; determining that the one of the plurality of communicators is selected for acquisition; and directing the real time transmission to the acquisition facility. As just one example, the real time transmission can indicate a destination to which the real time transmission is directed. Where such is the case, the methods can be implemented such that directing the real time transmission to the acquisition facility does not introduce perceptible delay at the destination and/or detectable changes in the real time transmission.

In particular cases, the IP media gateway is implemented as part of a session border controller that is logically located nearer to a communicator selected for acquisition than another session border controller. The communicators can be, but are not limited to, a wired telephone, a cellular telephone, an audio enabled personal computer, an audio enable personal digital assistant (PDA), a voice over internet protocol telephone, a video enable wired telephone, a video enable cellular telephone, a video enabled voice over internet protocol telephone, a video enabled personal computer, a video enable PDA, an entity, an individual, a logical location, and/or a physical location.

In some cases, the methods further include providing a converter facility communicably coupled between the IP media gateway and the acquisition facility. This converter can operate to provide information in a selected format such as, for example, J-STD-025B formatted information to the acquisition facility. Thus, as one example, the converter facility can receive packet cable standard format information from the IP media gateway and can output J-STD-025B formatted information to the acquisition facility.

In various instances the methods further include providing a computer readable medium that includes a list of communicators selected for acquisition. In such cases, determining that a communicator has been selected for acquisition can include accessing the computer readable medium. Further, the methods can include receiving a request to acquire transmissions associated with a particular communicator, and adding the particular communicator to the list of communicators selected for acquisition.

Other embodiments of the present invention provide systems for intercepting transmissions that include an IP media gateway communicably coupled to a soft switch, an acquisition facility, and at least one communicator. The systems further include a processor and a computer readable medium associated with the IP media gateway. The computer readable medium includes instructions executable by the processor to receive a transmission identified with the communicator, determine that the transmission associated with the communicator is selected for acquisition, and direct the transmission to the acquisition facility.

In particular cases, the computer readable medium includes a list of communicators for which associated transmissions are to be acquired. Further, the instructions executable by the processor to determine that the transmission associated with the communicator is selected for acquisition include instructions executable by the processor to access the list of communicators for which associated transmissions are to be acquired. In various cases, the communicator is communicably coupled to the IP media gateway via an internet service provider (ISP) network.

In some cases, the systems further include multiple communicators and the computer readable medium further includes instructions executable by the processor to receive a transmission parameter originating from the communicator, and to communicate signaling information to the soft switch based at least in part on the transmission parameter. The signaling information can be used by the soft switch to indicate a media path between the first communicator and a second communicator.

Yet other embodiments of the present invention provide an IP media gateway that includes a processor and a computer readable medium. The computer readable medium includes instructions executable by the processor to receive a real time transmission that is associated with a communicator and that includes an indication of a destination. The instructions are further executable to direct at least a portion of the real time transmission to an acquisition facility, and to direct at least another portion of the real time transmission to the destination.

In some instances, the IP media gateway further includes instructions executable to provide information associated with the real time transmission to a soft switch, receive communication information from the soft switch, and provide information associated with the real time transmission to the destination in accordance with the communication information from the soft switch. Further instructions can be included that are executable to receive information originating from the destination in accordance with the communication information from the soft switch.

Additional embodiments of the present invention provide real time transmission acquisition interfaces. Such interfaces include at least three signal sets. The first signal set is operable to communicate a first portion of a real time transmission information set to a soft switch. The second signal set is operable to communicate a second portion of the real time transmission information to an internet service provider. The third signal set is operable to direct a third portion of the real time transmission information to an acquisition facility. In some cases, one or more of the aforementioned portions of the real time transmission are identical, which in other cases one or more of the portions are different. As used herein, a signal set can be a group of physical wires such as a bus, or a group of software inputs and/or outputs that are available over one or more physical and/or wireless media.

In various cases, the real time transmission information includes audio information and signaling information. In such cases, the first portion of the real time transmission information includes the signaling information, the second portion of the real time transmission includes the audio information and the signaling information, and the third portion of the real time information includes the audio information. In various cases, the third portion of the real time transmission information additionally includes the signaling information. In a particular case, the interface includes a fourth signal set that is operable to communicate at least an audio portion of the real time transmission information to a destination.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
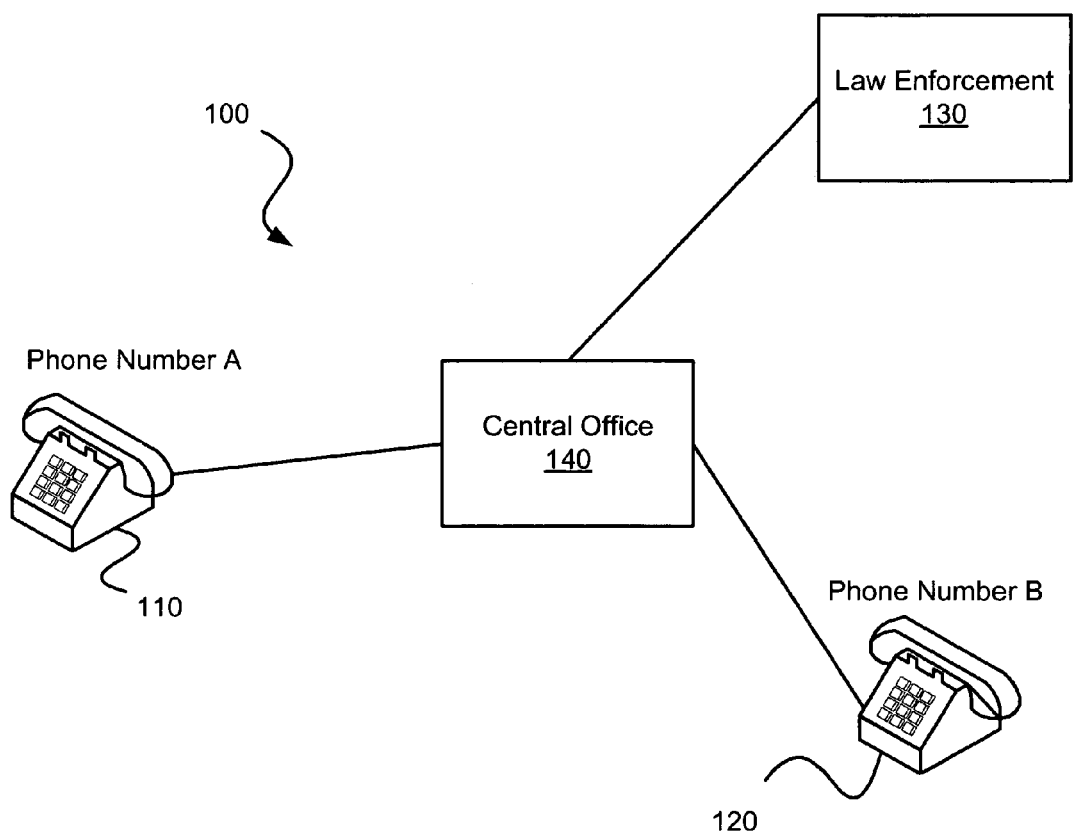
FIG. 1 depicts an existing system for monitoring audio transmissions.

The present invention provides systems and methods for monitoring various transmissions. More particularly, the present invention provides various methods for monitoring real time transmissions passed over an Internet Protocol (IP) network.

In various cases, the present invention can be applied to a voice over IP (VOIP) network to monitor real time transmissions ongoing in relation to one or more selected endpoints. As used herein, the term endpoint can be a logical location on a communication network such that communications ongoing in relation to the logical location can be targeted, a physical location such that communications emerging from the geographic location are targeted, and/or an individual or entity such that communications associated with the individual or entity are targeted. In some cases, endpoints are associated with communication devices that can include, but are not limited to, a wired telephone, a cellular telephone, an audio enabled personal computer, an audio enable personal digital assistant (PDA), a voice over internet protocol telephone, a video enable wired telephone, a video enable cellular telephone, a video enabled voice over internet protocol telephone, a video enabled personal computer, and/or a video enable PDA. As used herein, a communicator is used in its broadest sensed to include endpoints and/or communication devices. Thus, a communicator can be a location (physical or logical) where a transmission is sent to/from, an entity or individual associated with communications, and/or a communication device capable of receiving and/or sending such transmissions. In some cases, transmissions can be real time transmissions including, but not limited to, video, audio, chat rooms, instant messaging, combinations of the aforementioned, and/or the like. Also, as used herein, the term "quasi real time transmission" is used in its broadest sense to mean any transmission that is ongoing in either real time such as voice phone transmissions, or in substantially real time such as faxes and instant messaging. Based on the disclosure provided herein, one of ordinary skill in the art will recognize a variety of transmissions qualifying as "quasi real time" transmissions as that term is defined herein. In some cases, the terms "quasi real time" and "real time" are used interchangably herein. Thus, wherein the term "real time" is used, it should be broadly construed to include transmissions that fit the definition of quasi real time where such are not explicitly excluded.

As just one example, an audio transmission such as a VOIP telephone call ongoing between two endpoints can be detected, and at least a portion of the audio transmission is directed to an acquisition facility where the audio transmission is monitored. Based on the disclosure provided herein, one of ordinary skill in the art will appreciate that the systems and methods can be applied to monitor real time transmissions ongoing between a multiplicity of endpoints such as, for example, a conference call.

As used herein, an acquisition facility is any location, equipment, and/or software capable of receiving and recording real time transmissions. Thus, for example, where the real time transmission is an audio transmission the acquisition facility can be a tape recorder, a digital recorder, a server, a law enforcement location equipped with recording equipment, and/or the like. In some cases, the information passed to the acquisition facility traverses a converter or converter facility where the information is prepared for the acquisition facility. As used herein, a converter or converter facility is any location, equipment, and/or software capable of receiving information from a network and preparing the information for passage to an acquisition facility.

Turning to FIG. 1, an existing system 100 for monitoring audio transmissions is illustrated. System 100 includes to or more telephones 110, 120 each physically coupled to a central office 140. Each of telephones 110, 120 is associated with a respective telephone number. System 100 further includes physical coupling of a law enforcement agency 130 to central office 140.

In operation, law enforcement agency 130 obtains a court order allowing it to monitor communications ongoing in relation to one or more of telephones 110, 120. Law enforcement agency 130 then presents the court order to a telecommunications company responsible for central office 140. The telecommunications company then implements monitoring of the audio transmissions occurring in relation to the designated telephone number. In particular, where the telephone number associated with telephone 110 is selected for acquisition, a telephone call either two or from telephone 110 is flagged at central office 140. A copy of the flagged telephone call is secured and provided to law enforcement agency 130. Such an approach works in a standard telecommunications system that relies on ubiquitous telephone numbers and passage through a central office. Such an approach is not effective for a growing variety of telephone services.

Figure 2:
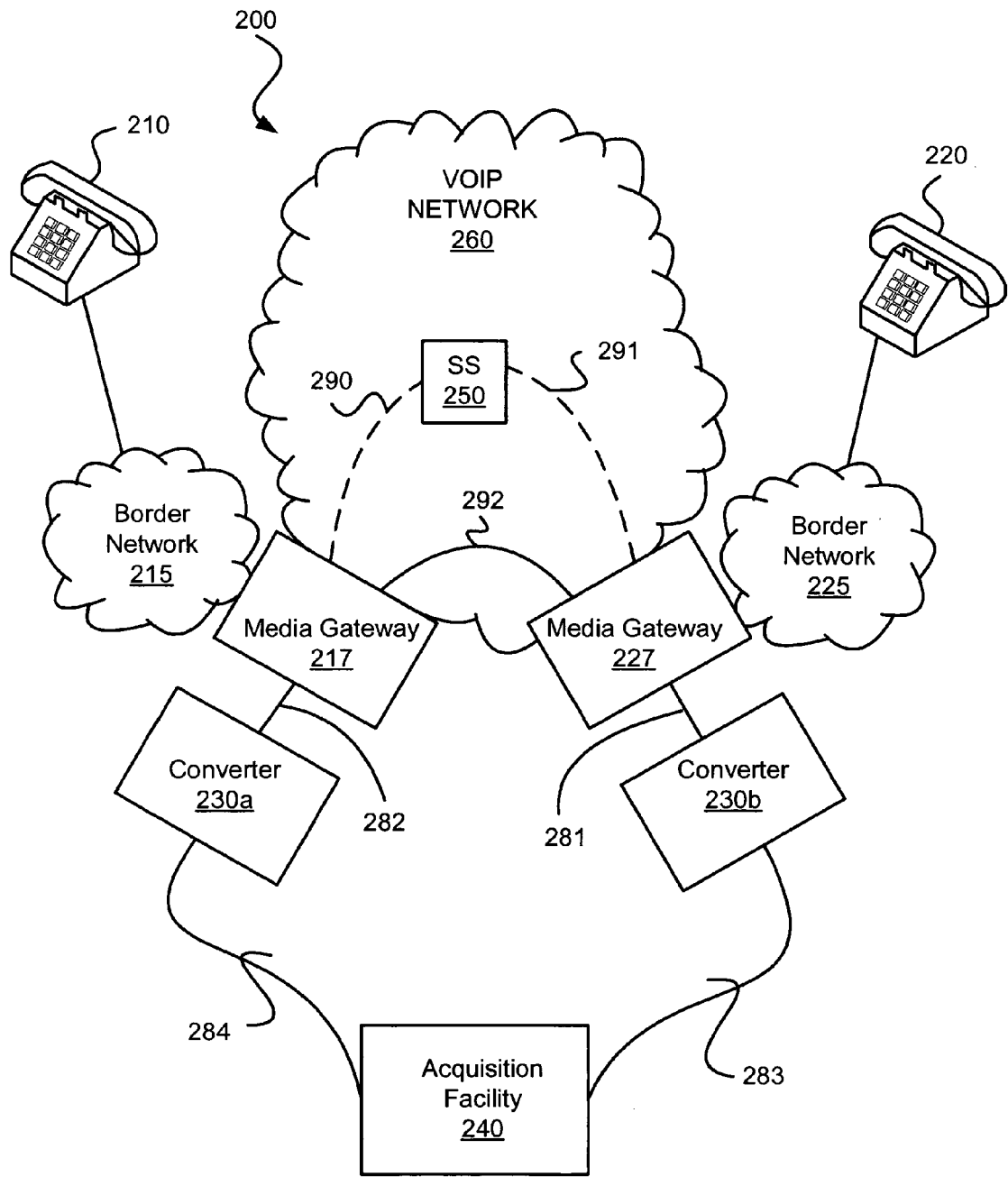
FIG. 2 depicts a system in accordance with the present invention for monitoring transmissions.

Turning to FIG. 2, a system 200 for monitoring transmissions in accordance with some embodiments of the present invention is illustrated. System 200 includes a VOIP network 260 that includes one or more soft switches 250 capable of routing various transmissions across VOIP network 260. System 200 further includes one or more communicators capable of accessing VOIP network 260 either directly or indirectly. One or more IP media gateways 217, 227 each associated with one or more border networks 215, 225 are also included. As used herein, an IP media gateway can be any microprocessor based machine used to control and/or protect the border of an IP network and an adjoining network. Thus, as just one example, an IP media gateway can be a session border controller. Border networks 215, 225 can be any network capable of communicably coupling one or more communicators 210, 220 with VOIP network 260 via an IP media gateway 217, 227. Thus, border networks can include Wi-Fi points, Internet Service Provider (ISP) networks, public switched telephone networks (PSTN), enterprise networks, virtual private networks (VPN), and/or the like. As used herein, the term communicably coupled is used in its broadest sense to mean any type of coupling whereby information can be passed between two or more points. Thus, for example, communicable coupling can include wired and/or wireless coupling. System 200 also includes one or more converters 230 communicably coupled to one or more acquisition facilities 240. In some cases, the acquisition facility can be a law enforcement agency collection facility.

In operation, a transmission is initiated from, for example, communicator 210 that is directed to communicator 220. The transmission is received at border network 215 and directed to soft switch 250 via IP media gateway 217. The transmission indicates the originating communicator 210 and the destination communicator 220. Based on this signaling information, soft switch 250 communicates transmission path information 290 to IP media gateway 217 and transmission path information 291 to IP media gateway 227. This transmission path information indicates a transmission path 292 via which media information is passed between communicators 210, 220. Thus, the signaling is communicated via soft switch 250, and the communicated media is passed between IP media gateway(s) 217, 227 and border network(s) 215, 225 associated with respective communicators 210, 215.

Based on the disclosure provided herein, one of ordinary skill in the art will appreciate that two or more communicators can be associated with on IP media gateway, and that any communications passing between such communicators can be passed through soft switch 250 using the common IP media gateway, or can be handled by a switching function implemented as part of the IP media gateway. Alternatively, or in addition, two or more communicators can be communicating via a common border network and IP media gateway, or the same border network and a different IP media gateway. Other alternatives are also possible in accordance with the present invention.

In addition to interacting with soft switch 250 and border network 215, IP media gateway 217 is associated with a computer readable medium (e.g., a hard disk drive, a server, and/or the like) that includes a list of communicators and/or endpoints designated for acquisition. In some cases, the list of communicators includes a list of IP addresses associated with particular communication devices, locations, entities and/or users. In addition, the list of communicators can include a list of telephone numbers and/or other information capable of designating the source and/or destination of a particular transmission. In some cases, the list of communicators is encrypted, and access to the list is limited. Such an approach limits the ability of an individual or entity subject to acquisition from determining such. Upon receiving a transmission, IP media gateway accesses the list of communicators designated for acquisition to determine if any communicator indicated by the received transmission is included on the list. The communicators indicated by the transmission can include communicators identified as the source or destination of the transmission.

Where it is determined that a communicator associated with a received transmission is included on the list of communicators designated for acquisition, the transmission is forked (i.e., a tap is performed by making a copy of the transmission and directing the copy to a secondary location) and the forked portion of the transmission is directed to acquisition facility 240 via converter 230a. In one embodiment, converter 230a receives the forked transmission as packet cable standard formatted data 282 from IP media gateway 217, and in turn provides the forked transmission to acquisition facility 240 in J-STD-025B formatted data 284. Based on the disclosure provided herein, one of ordinary skill in the art will recognize other data formats that can be used in accordance with the present invention. Further, based on the disclosure provided herein, one of ordinary skill in the art will recognize that converters 230 can be incorporated into the respective IP media gateways 217, 227, and/or a single converter 230 can serve multiple IP media gateways 217, 227.

A number of IP media gateways 217, 227 can be configured to fork transmissions that have been selected for acquisition.

Thus, as another example, where communicator 220 has been designated for acquisition, a transmission originating from or destined to communicator 220 can be forked at IP media gateway 227. The forked transmission is provided to converter 230b by IP media gateway 227 as packet cable standard formatted data 281, and in turn converter 230b provides the forked transmission to acquisition facility 240 as J-STD-025B formatted data 283. In some cases, acquisition facility 240 includes access to one or more keys allowing for access to transmissions detected in an encrypted format.

In some embodiments of the present invention, where a communicator is selected for acquisition, the IP media gateway located logically and/or physically nearest the selected communicator is chosen to perform the forking function. In some cases, this can reduce the potential for detection of the transmission fork at either the source communicator or destination communicator(s) associated with a monitored transmission. In particular, such an arrangement can limit any latency introduced to a transmission, and/or limit any irregularities in the number of hops and/or media gateways traversed in completing the transmission. In particular embodiments of the present invention, a tap can be performed that is not detectable at any communicator associated with the transmission.

Figure 3:
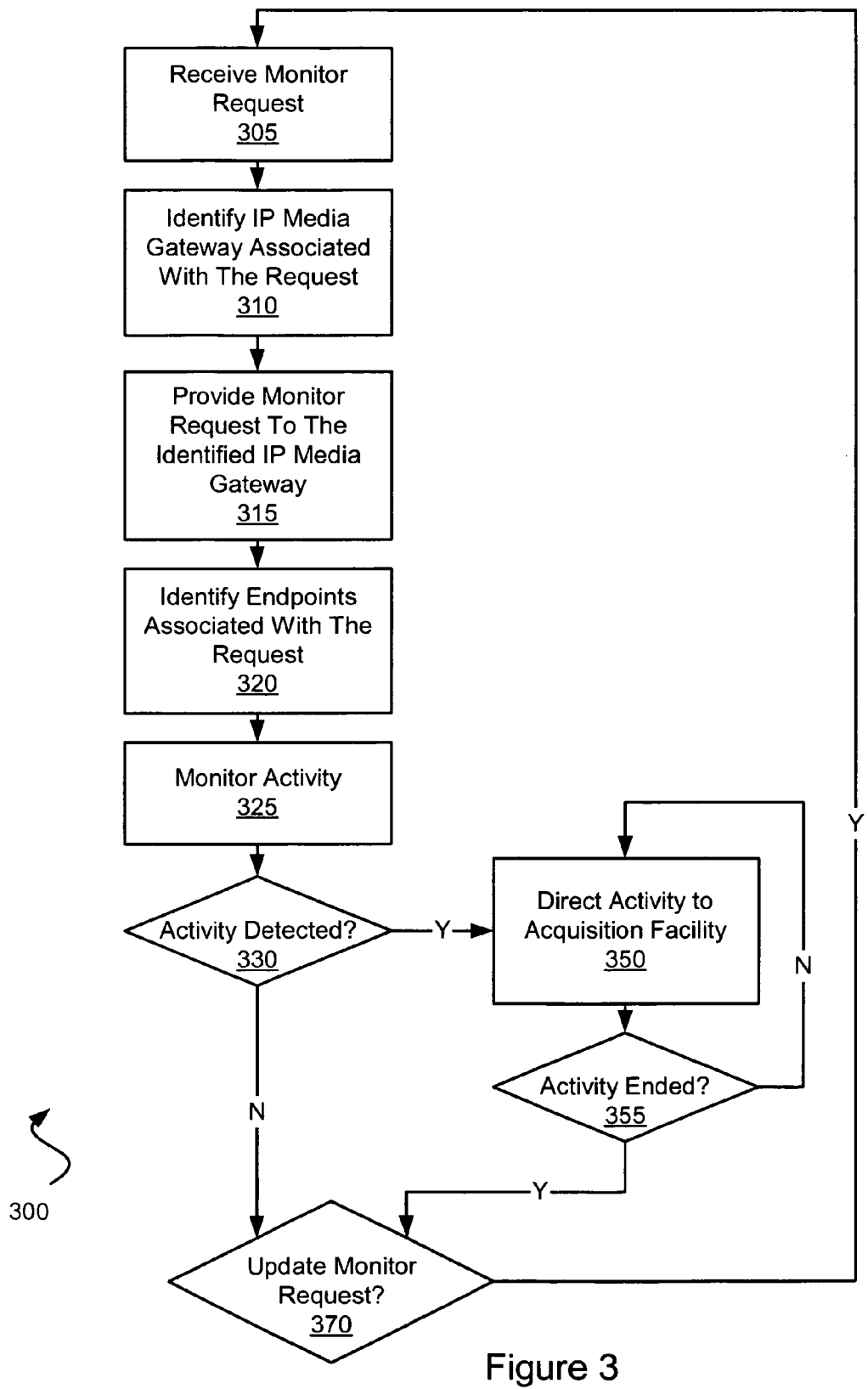
FIG. 3 is a flow diagram illustrating a method in accordance with various embodiments of the present invention.

Turning to FIG. 3, a flow diagram 300 illustrates a method in accordance with various embodiments of the present invention for acquiring transmissions selected for acquisition. Following flow diagram 300, a request to monitor (i.e., acquire) one or more transmissions associated with one or more communicators is received (block 305). In some cases, this request is provided by a law enforcement agency that has obtained a court order, subpoena, Title III request, FISA request or other permission allowing for the monitoring. This request can be provided to an entity having some control over the operations of VOIP network 260 and/or one or more border networks 215, 225. Upon receiving the request (block 305), an IP media gateway associated with the request is identified (block 310). This can include, for example, identifying an IP media gateway(s) located logically and/or physically nearest the communicator(s) identified in the request for monitoring.

The request is provided to the identified IP media gateway(s) (block 315). This can be done by updating a list of communicators selected for acquisition that is accessible to the identified IP media gateway(s). In some cases, this list can be maintained on a computer readable medium implemented as part of a given IP media gateway, as part of soft switch 250, or available as a resource somewhere on VOIP network 260, border networks 215, 225, and/or acquisition facility 240. Based on the disclosure provided herein, one of ordinary skill in the art will recognize a number of other physical and/or logical locations for the computer readable medium. The request provided to the identified media gateway(s) (block 315) includes an indication of one or more communicators associated with the request (block 320). As previously discussed, these communicators can be identified as IP addresses associated with particular communication devices, locations and/or users. In addition, the list of communicators can include a list of telephone numbers, URLs and/or other information capable of designating the source and/or destination of a particular transmission.

Activity associated with VOIP network 260 and/or border networks 215, 225 is monitored to determine if any of the activity is ongoing in relation to a communicator selected for acquisition (block 325). Where it is determined that a transmission is either originating from or destined for a communicator included on the list (block 330), the transmission at issue is forked with the forked transmission being directed to the acquisition facility via the converter (block 350). The direction of the transmission to the acquisition facility continues until activity associated with the transmission completes (block 355).

Based on the discussion provided herein, one of ordinary skill in the art will recognize that a number of acquisition processes (threads) can be ongoing in parallel. Further, monitoring of other transmissions passing through the network(s) can be monitored while various transmissions are being acquired.

It is determined if a change to the monitor request is received (block 370). Such a change can include, but is not limited to, either a deletion or an addition to the list of communicators selected for acquisition. Where such a change to the monitor request is received (block 370), the process cycles to blocks 305-320 where the identified communicators are added or deleted in accordance with the request and the monitoring continues with the updated list of communicators selected for acquisition. Alternatively, where no additional request exists (block 370), the activity monitoring (block 325-355) continues as previously described.

Figure 4:
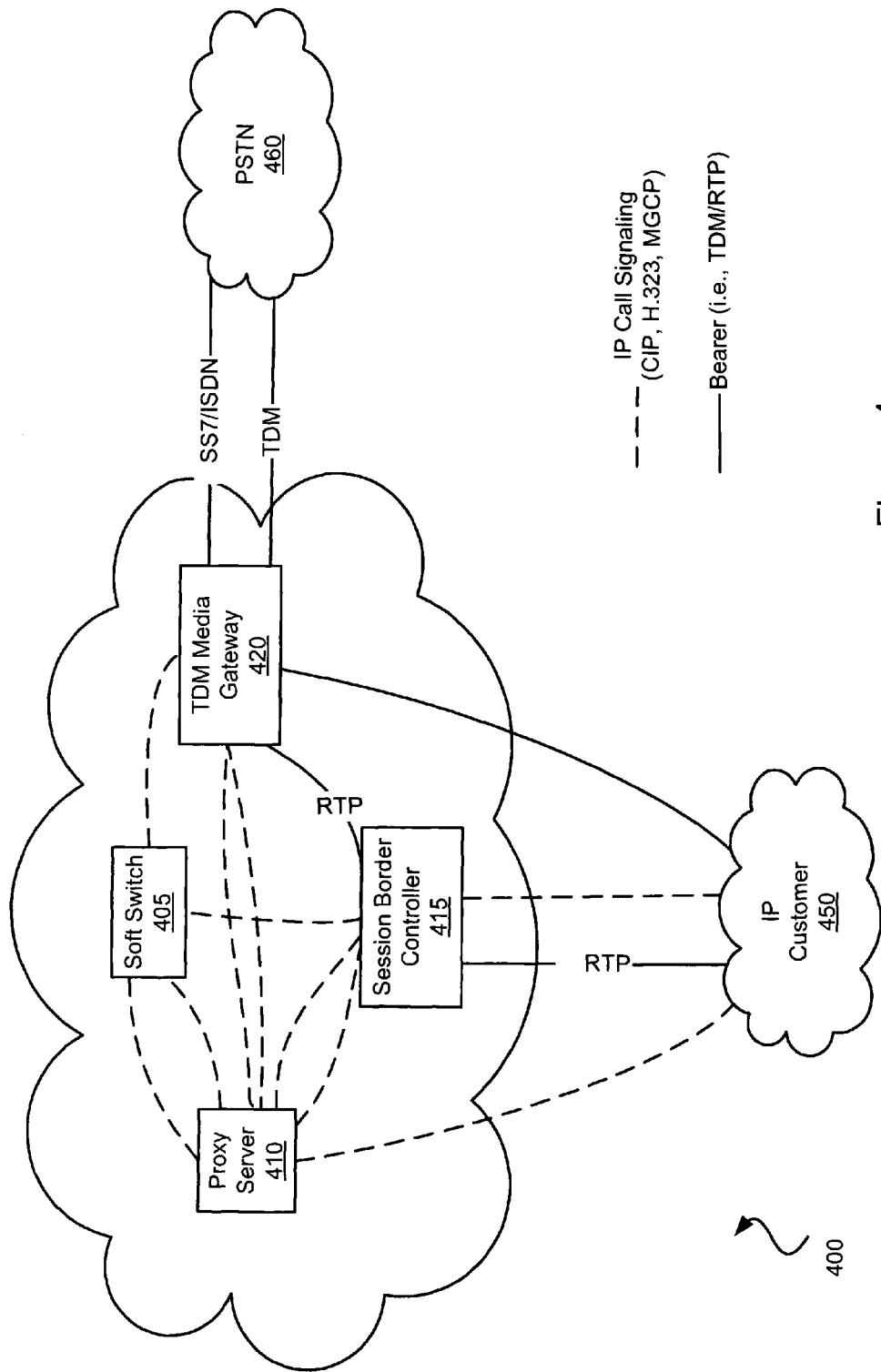
FIGS. 4-6 illustrate systems in accordance with other embodiments of the present invention.

Turning to FIG. 4, another system 400 in accordance with various embodiments of the present invention for acquiring transmissions associated with selected communicators is depicted. System 400 includes a soft switch 405, a proxy server 410, an IP media gateway 415, and a proprietary media gateway 420 interfacing various border networks such as a PSTN 460. As illustrated a real time transport protocol (RTP) can be utilized for communications between various of the system elements, session initiation protocol (SIP) can be used between some of the elements, and SS7 protocol can be used between various of the other elements. System 400 can be implemented, for example, by a wholesale telecommunications service provider that sells services to other carriers or service providers, and/or directly to an end user of telecommunication services. System 400 can be used to pass transmissions internally as IP packets, but provide the transmissions externally in one or more defined formats. From a signaling perspective, system 400 provides an ability to support SS7 signaling to a PSTN as well as accepting SIP signaling from customers and carriers.

Further, system 400 enables compliance with the United States Communication Assistance for Law Enforcement Act where IP media gateway 415 is tailored for detecting transmissions associated with selected communicators and for forwarding the detected transmissions to an acquisition facility (not shown). In some cases, such compliance can be achieved while supporting voice services commonly supported across IP networks, and with minimal architectural changes to such networks. In some cases, system 400 is also extensible to future voice and/or data title III requirements, and exhibits low deployment and/or development costs.

Figure 5:
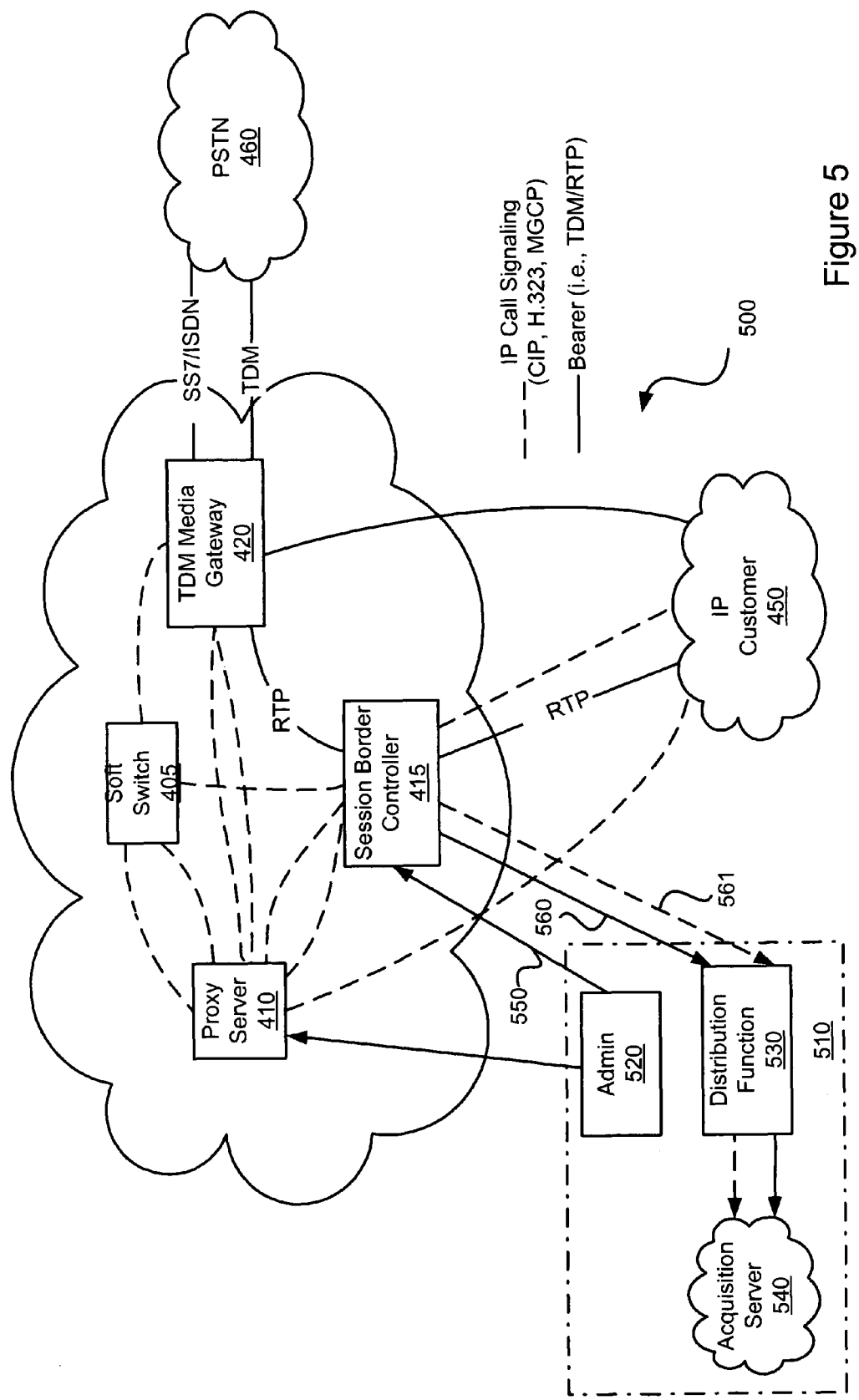

Turning to FIG. 5, a system 500 illustrates the aforementioned system 400 augmented to include an acquisition facility 510. In particular, system 500 provides an architecture for directing transmissions that can include, but are not limited to, voice transmissions originating or terminating on the IP-peered side of the to acquisition facility 510 via IP media gateway 415. Acquisition facility 510 includes an acquisition server 540, a distribution function server 530, and an administrator 520. In operation, administrator 520 notifies one or more IP media gateways 415 operating on the network that transmissions associated with a particular communicator are to be acquired. This notification can be passed via a transmission protocol and/or interface 550 that can be proprietary, or can be implemented using extensions to open standard protocols, such as SIP, for example using Subscribe and/or Unsubscribe methods. In some cases, such notification includes providing a computer readable medium with a list of communicators selected for acquisition, and an indication that the list has been modified. This list can be accessed in real time by IP media gateway 415, or can be transferred on occasion to a computer readable medium more easily accessible to IP media gateway 415.

When IP media gateway receives a transmission (associated with an IP-peered customer), it determines one or more communicators associated with the transmission and whether those communicators have been designated for acquisition. Where a transmission is selected for acquisition, IP media gateway 415 forks both the signaling and the media associated with the transmission, and directs one copy of the transmission to the destination(s) indicated by the transmission, and another copy to distribution function 530. The signaling protocol and/or interface 561 and the media protocol and/or interface 560 between distribution function 530 and IP media gateway 415 can be a proprietary API, an existing standard for encapsulation of the SIP signaling (as one example, SNMP or RADIUS with VSA extensions), or it could be an open standard (RTP directed to port x and x+1 for bi-directional media). Distribution function 530 then passes the transmission to acquisition server 540 for storage.

In the architecture, IP media gateway 415 is logically located such that IP traffic traversing the network passes through it. By implementing such an architecture, only one interface, that of IP media gateway 415, may be needed to interface the network with acquisition portion 510. This limits the amount of development and maintenance that is involved in supporting a network compliant with the United States Communication Assistance for Law Enforcement Act. In some cases, to assure that all transmissions pass through IP media gateway 415, routing within the network may need to be modified through, for example, modifications in soft switch 405.

Figure 6:
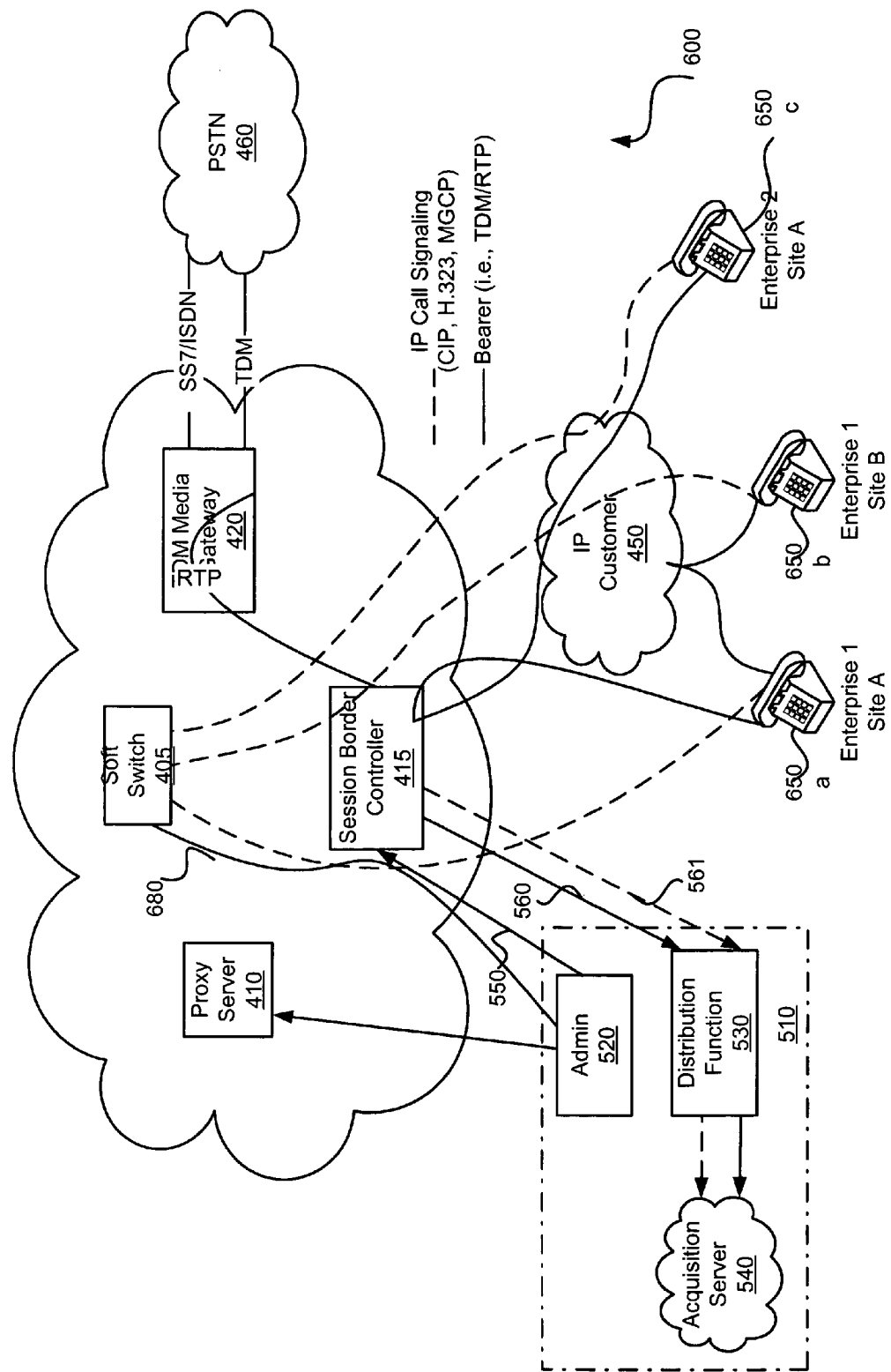

Turning to FIG. 6, a system 600 is implemented using an architecture that allows for compliance with the United States Communication Assistance for Law Enforcement Act where an IP-Centrex solution has been employed. System 600 includes one or more enterprise communicators 650 coupled to the network via a soft switch 405. In such systems, transmissions between enterprise communicators 650 can be routed by soft switch 405 such that the entity providing the network including IP media gateway 415 does not necessarily provide the IP connectivity (T1/T3) down to the end-users. In particular, RTP between IP-Centrex endpoints may never under normal conditions flow through the network. To provide for acquisition of such enterprise transmissions, signaling information 680 from soft switch 405 to administrator 520 is provided. Where the signaling indicates a communicator selected for acquisition, the RTP and the SIP associated with the communicator selected for acquisition is directed through IP media gateway 415. The IP media gateway can then provide the transmission to acquisition facility 510 as previously described. In any case where signaling and media are routed through the IP media gateway, a flag indicating the routing can be set, and relied upon to avoid recursive routing through the IP media gateway.

The invention has now been described in detail for purposes of clarity and understanding. However, it will be appreciated that certain changes and modifications may be practiced within the scope of the appended claims. For example, while the description is generally based on a software switch architecture, one of ordinary skill in the art relying on the disclosure provided herein will recognize that a soft switch architecture is not the only method for control and that systems and methods in accordance to the present invention may also be applied to peer-to-peer and other connection architectures known in the art. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for intercepting quasi real time internet protocol transmissions, the method comprising:
   providing an internet protocol media gateway, wherein the internet protocol media gateway communicably couples a real time transmission internet protocol network with a plurality of communicators, and wherein the internet protocol media gateway is communicably coupled to an acquisition facility;
   receiving a quasi real time transmission at the internet protocol media gateway associated with one of the plurality of communicators;
   determining that the one of the plurality of communications is selected for acquisition;
   directing a copy of a media portion of the quasi real time transmission to the acquisition facility via a first interface; and
   directing a copy of a signaling portion of the quasi real time transmission to the acquisition facility via a second interface.

2. The method of claim 1, wherein the real time transmission indicates a destination, and wherein the method further comprises:
   directing the quasi real time transmission to the destination.

3. The method of claim 2, wherein directing the quasi real time transmission to the acquisition facility does not introduce perceptible delay at the destination.

4. The method of claim 2, wherein directing the quasi real time transmission to the acquisition facility does not introduce detectable changes in the quasi real time transmission.

5. The method of claim 1, wherein the quasi real time transmission is selected from a group consisting of:
   an audio transmission;
   a video transmission;
   an instant messenger transmission; and
   a fax transmission.

6. The method of claim 1, wherein the internet protocol media gateway is implemented as part of a session border controller, and wherein the session border controller is logically located nearer to the one of the plurality of communicators than another session border controller.

7. The method of claim 6, wherein the plurality of communicators includes at least one communicator selected from a group consisting of:
   a wired telephone;
   a cellular telephone;
   an audio enabled personal computer;
   an audio enabled personal digital assistant;
   a voice over internet protocol telephone;
   a video enabled wired telephone;
   a video enabled cellular telephone;
   a video enabled voice over internet protocol telephone;
   a video enabled personal computer; and
   a video enabled personal digital assistant.

8. The method of claim 6, wherein the method further comprises:
   providing a converter facility communicably coupled between the internet protocol media gateway and the acquisition facility, wherein the converter facility is operable to provide a selected format information to the acquisition facility.

9. The method of claim 6, wherein the method further comprises:
providing a computer readable medium, wherein the computer readable medium includes a list of communicators selected for acquisition, wherein determining that the one of the plurality of communicators is selected for acquisition includes accessing the computer readable medium.

10. The method of claim 9, wherein the method further comprises:
receiving a request to acquire transmissions associated with a particular communicator; and
adding the particular communicator to the list of communicators selected for acquisition.

11. The method of claim 1, wherein directing a copy of at least a media portion of the quasi real time transmission to the acquisition facility includes formatting the quasi real time transmission in a packet cable standard format.

12. A system for intercepting transmissions, the system comprising:
an internet protocol media gateway, wherein the internet protocol media gateway is communicably coupled to an acquisition facility, and a communicator;
a processor associated with the internet protocol media gateway; and
a computer readable medium associated with the internet protocol media gateway, wherein the computer readable medium includes instructions executable by the processor to:
receive a transmission identified with the communicator;
direct a copy of a media portion of the transmission to the acquisition facility via a first interface; and
direct a copy of a signaling portion of the transmission to the acquisition facility via a second interface.

13. The system of claim 12, wherein the IP media gateway is further communicably coupled to a soft switch, wherein the communicator is a first communicator, and wherein the computer readable medium further includes instructions executable by the processor to:
receive a transmission parameter originating from the communicator; and
communicate signaling information to the soft switch based at least in part on the transmission parameter, wherein the signaling information is used by the soft switch to indicate a media path between the first communicator and a second communicator.

14. The system of claim 12, wherein the computer readable medium further includes instructions executable by the processor to:
determine that the transmission associated with the communicator is selected for acquisition.

15. The system of claim 14, wherein the computer readable medium includes a list of communicators for which associated transmissions are to be acquired, and wherein the instructions executable by the processor to determine that the transmission associated with the communicator is selected for acquisition includes instructions executable by the processor to access the list of communicators for which associated transmissions are to be acquired.

16. The system of claim 12, wherein the transmission is a real time transmission.

17. The system of claim 12, wherein the communicator is selected from a group consisting of: an audio device, and a video device.

18. The system of claim 13, wherein the communicator is an audio device, and wherein the audio device is selected from a group consisting of:
a wired telephone;
a cellular telephone;
an audio enabled personal computer;
an audio enabled personal digital assistant; and
a voice over internet protocol telephone.

19. The system of claim 13, wherein the communicator is communicably coupled to the internet protocol media gateway via an internet service provider network.

20. The system of claim 12, wherein the system further includes a converter facility disposed between the internet protocol media gateway and the acquisition facility, and wherein the converter facility is operable to provide a selected format information to the acquisition facility.

21. The system of claim 12, wherein the internet protocol media gateway is implemented as part of a session border controller associated with a voice over internet protocol network, and wherein the session border controller is logically located nearer to the communicator than another session border controller.

22. A system for intercepting enterprise transmissions, the system comprising:
a soft switch, wherein the soft switch is communicably coupled to a plurality of enterprise communicators and to an administrator associated with an acquisition facility;
an internet protocol media gateway, wherein the internet protocol media gateway is communicably coupled to the soft switch, the acquisition facility, and at least one of the plurality of enterprise communicators;
a first processor associated with the soft switch;
a first computer readable medium associated with the soft switch, wherein the first computer readable medium includes instructions executable by the first processor to:
receive acquisition information from the administrator; and
based at least in part on the acquisition information, direct a transmission associated with one of the at least one of the enterprise communicators to the IP media gateway;
a second processor associated with the internet protocol media gateway; and
a second computer readable medium associated with the internet protocol media gateway, wherein the computer readable medium includes instructions executable by the processor to:
receive the transmission associated with the at least one of the enterprise communicators;
direct a copy of a media portion of the transmission associated with the at least one of the enterprise communicators to the acquisition facility via a first interface; and
direct a copy of a signaling portion of the transmission associated with the at least one of the enterprise communicators to the acquisition facility via a second interface.

23. An internet protocol media gateway, wherein the internet protocol media gateway comprises:
a processor; and
a computer readable medium, wherein the computer readable medium includes instructions executable by the processor to:

receive a real time transmission, wherein the real time transmission is associated with a communicator, and wherein the real time transmission includes an indication of a destination;

direct at least a media portion of the real time transmission to an acquisition facility;

direct a signaling portion of the real time transmission to the acquisition facility via a first interface; and direct another portion of the real time transmission to the destination via a second interface.

24. The internet protocol media gateway of claim 23, wherein the communicator is the destination.

25. The internet protocol media gateway of claim 23, wherein the communicator is a first communicator, and wherein the destination is a second communicator.

26. The internet protocol media gateway of claim 23, wherein the computer readable medium further includes instructions executable by the processor to format the at least a media portion of the real time transmission provided to the acquisition facility into a packet cable specification format.

27. The internet protocol media gateway of claim 23, wherein the instructions executable by the processor to direct the portion of the real time transmission to the destination include instructions executable to:

provide information associated with the real time transmission to a soft switch;

receive communication information from the soft switch; and provide information associated with the real time transmission to the destination in accordance with the communication information from the soft switch.

28. The internet protocol media gateway of claim 27, wherein the instructions executable by the processor to direct the portion of the real time transmission to the destination include instructions executable to:

receive information originating from the destination in accordance with the communication information from the soft switch.

29. A method for intercepting real time internet protocol transmissions, the method comprising:

providing an internet protocol media gateway, wherein the internet protocol media gateway communicably couples a voice over internet protocol network with a plurality of communicators, and wherein the internet protocol media gateway is communicably coupled to an acquisition facility;

receiving a real time transmission at the internet protocol media gateway associated with one of the plurality of communicators;

determining that the one of the plurality of communicators is selected for acquisition;

directing a copy of a media portion of the real time transmission to the acquisition facility via a first interface; and directing a copy of a signaling portion real time transmission to the acquisition facility via a second interface.

30. The method of claim 1, wherein the first interface is distinct from the second interface.

31. The system of claim 12, wherein the first interface is distinct from the second interface.

32. The system of claim 22, wherein the first interface is distinct from the second interface.

33. The internet protocol media gateway of claim 23, wherein the first interface is distinct from the second interface.

34. The method of claim 29, wherein the first interface is distinct from the second interface.

* * * * *